United States Patent Office 3,272,845
Patented Sept. 13, 1966

3,272,845
BISGLYCIDYL ETHERS OF ISOHEXIDES
John D. Zech, Wilmington, and John W. Le Maistre, Claymont, Del., assignors to Atlas Chemical Industries, Inc., Wilmington, Del., a corporation of Delaware
No Drawing. Filed Mar. 21, 1963, Ser. No. 266,790
3 Claims. (Cl. 260—347.8)

This invention relates to novel chemical compounds and to a process for preparing them. More particularly it relates to bisglycidyl ethers of isohexides and to their synthesis.

Bisglycidyl ethers of dihydric compounds are known in the art, particularly in the synthetic resin art. Thus the bisglycidyl ethers of dihydric phenolic compounds and of aliphatic glycols containing two primary hydroxyl groups are utilized in preparing the well known epoxy resins. The isohexides are dihydric heterocyclic compounds which have a unique bicyclic structure of fused tetrahydro furan rings exemplified by the formula

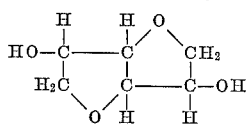

Diepoxides containing this unique structural grouping have not heretofore been available and the usual procedures for preparing bisglycidyl ethers of dihydric compounds have been found inapplicable to their synthesis.

It is an object of the present invention to provide bisglycidyl ethers of the isohexides.

A further object is to provide a method of producing the said bisglycidyl ethers.

A still further object is to provide novel compounds having an inhibitory effect on the growth of certain cancerous cells.

The novel compounds of the invention are bisglycidyl ethers of isohexides among which may be named specifically the bisglycidyl ether of isosorbide, the bisglycidyl ether of isomannide and the bisglycidyl ether of isoidide.

The isohexides are known compounds, readily obtainable by the anhydrization of the corresponding hexitols with the removal of two molar proportions of water. Attempts to prepare their bisglycidyl ethers by the conventional means of reacting with epichlorhydrin followed by dehydrohalogenation have uniformly failed to yield the desired product. Application of a known alternative route for preparing glycidyl ethers of hydroxy compounds, namely, the epoxidation of diallyl ethers of the isohexides with aqueous per-acetic acid has likewise failed to produce the desired bisglycidyl ethers.

In accordance with the present invention the bisglycidyl ethers of the three named isohexides are prepared by forming a solution of a salt of the isohexide by reaction with an alkali metal hydride, reacting the formed solution with a stoichiometric excess of epichlorohydrin, and recovering the formed bisglycidyl ether from the reaction mixture. The process of the invention will be more fully understood by consideration of the following illustrative examples.

EXAMPLE I.—PREPARATION OF ISOSORBIDE BISGLYCIDYL ETHER, 2,5-BIS-O(2,3-EPOXYPROPYL)-1,4:3,6-DIANHYDRO-D-GLUCITOL

Anhydrous isosorbide (1.23 moles, 180 g.) and diglyme (diethylene glycol dimethyl ether, 900 ml.) were placed in a 3 liter round bottom flask equipped with a stirrer, condenser, thermometer and an adapter through which nitrogen was passed. A 54.5% mixture of sodium hydride in mineral oil (2.50 moles 109.6 g.) was added portionwise over a period of 5¾ hours to the isosorbide solution at a temperature of 43–48°. Following the addition of the sodium hydride, diglyme (300 ml.) was added, the reaction mixture was heated at 85° for 1 hour and then allowed to stand overnight. The disodium salt of isosorbide, obtained in the above described fashion, was added in small increments over a 6 hour period to epichlorohydrin (19.9 moles, 1564 ml.) contained in a 5 liter 3 neck round bottom flask equipped with a stirrer, thermometer, condenser and an adapter through which nitrogen was passed. The reaction mixture was stirred overnight at room temperature and then heated at 55° for 2½ hours. Filtration through a Büchner funnel was employed to separate sodium chloride which was formed during the course of this reaction, the solid in the Büchner funnel was, washed with 2 150-ml. portions of tetrahydrofuran. The washes and filtrate were combined and concentrated in a nitrogen atmosphere up to terminal conditions of a pot temperature of 60° at 1 mm. Hg. Distilled water (25 ml.) was added to the residue, the mixture was shaken and then allowed to settle into 2 immiscible liquids. The liquid with the lower density weighed 56.5 g. and was mineral oil. The liquid having the greater density was concentrated in a nitrogen atmosphere under vacuum to terminal conditions of 30° at 0.2 mm. Hg. In this fashion 252 g. liquid was obtained which had an epoxide equivalent of 278 (calculated epoxide equivalent for the bisglycidyl ether of isosorbide is 129). The product was fractionated by distillation under vacuum in an inert (nitrogen) atmosphere, the bisglycidyl ether coming over at 162° to 165° under a pressure of 0.15 millimeter of mercury. The yield was 55.9 grams (17.6% of theory for the sought bisglycidyl ether) and its epoxide equivalent was 134 (theory for the sought ether=129). The product was a colorless liquid of moderate viscosity having a refractive index of 1.4905.

EXAMPLE II.—ISOMANNIDE BISGLYCIDYL ETHER, 2,5-BIS-O-(2,3-EPOXYPROPYL)-1,4:3,6-DIANHYDRO-D-MANNITOL

Anhydrous isomannide (1.23 moles, 180 g.) and diglyme (1500 ml.) were placed in a 3 liter round bottom flask having a tube and stopcock attached to the bottom of the flask. The flask was equipped with a stirred, thermometer, an adapted through which nitrogen was passed and a condenser which was attached to a drying tube filled with Drierite. The isomannide solution was heated to 55° and a mixture of 53.5% sodium hydride in mineral oil (2.50 moles, 112 g.) was added portionwise over a period of 1 hour with vigorous agitation at a temperature range of 55–59°. Following the addition of the sodium hydride, the reaction mixture was heated at 90° for 4 hours and then allowed to stand over the weekend. The flask containing the disodium salt of isomannide, prepared as described above, was connected by means of a glass tube attached to the tube at the bottom of the flask to a 5 liter 3 neck round bottom flask equipped with a stirrer, thermometer, condenser to which a drying tube filled with Drierite was attached and an adapter through which nitrogen was passed. Epichlorohydrin (19.95 moles, 1564 ml.) was placed in the 5 liter flask and the suspension of the disodium derivative of isomannide was added portionwise with vigorous stirring over a period of 5 hours at a temperature range of 25 to 70° (the increase in temperature is the result of external heating and not due to an exothermic reaction). Following the addition of the disodium derivative of isomannide to epichlorohydrin, the mixture was stirred overnight at room temperature and then at 85–90° for 25 hours. The reaction mixture was cooled at 25° and filtered through a Büchner funnel. The solid in the funnel was washed with 3 150-ml. portions of tetrahydrofuran and the washes were combined with the filtrate.

The combined washers and filtrate were concentrated in a nitrogen atmosphere up to terminal conditions of a pot temperature of 80° at 0.2 mm. Hg. The residue obtained in this fashion consisted of two immiscible liquids which were separated via a separatory funnel. The liquid with the lower density weighed 43 g. and was identified as mineral oil. The liquid with the greater density weighed 225 g. and had an epoxide equivalent of 190 (calculated epoxide equivalent for isomannide bisglycidyl ether is 129).

By fractional distillation under reduced pressure in an inert (nitrogen) atmosphere the sought bisglycidyl ether was recovered in a yield of 14.6% of theory. It boiled over a range of 185° C. at 0.18 mm. to 189° C. at 0.11 mm. of mercury and had a refractive index of 1.4929. Its found epoxide equivalent was 136.

EXAMPLE III.—ISOIDIDE BISGLYCIDYL ETHER, 2,5 - BIS-O(2,3-EPOXYPROPYL)-1,4:3,6-DIANHYDRO-L-IDITOL

The apparatus employed in this experiment consisted of a 3 liter 3 neck round bottom flask with a tube and stopcock at the bottom of the flask connected through a glass tube to a 5 liter 3 neck round bottom flask at a lower level. A solution of anhydrous isoidide (1.23 moles, 180 g.) in diglyme (1500 ml.) was placed in the 3 liter flask which was equipped with a stirrer, thermometer, condenser attached to a drying tube filled with Drierite and an adapter through which nitrogen was passed. The isoidide solution was heated to 58° and a dispersion of 53.5% sodium hydride in mineral oil (2.50 moles, 112 g.) was added portionwise with vigorous stirring over a period of 2 hours while maintaining the temperature at 56–59°. The mixture was stirred overnight (22.5 hours) at room temperature and then it was added to epichlorohydrin (18.3 moles, 1433 ml.) which was contained in the 5 liter flask equipped with a stirrer, thermometer, condenser attached to a drying tube filled with Drierite and an adapter through which nitrogen was passed. The disodium derivative of isoidide was added portionwise and with vigorous agitation to the epichlorohydrin over a period of 4½ hours at a temperature range of 30–86° (the increase in temperature is the result of external heating and is not due to an exothermic reaction). The reaction mixture was stirred at 86–88° for 24 hours, cooled to room temperature and filtered through a Büchner funnel. The solid in the funnel was washed with 3 150-ml. portions of tetrahydrofuran and the washes were combined with the filtrate. The combined washes and filtrate were concentrated in a nitrogen atmosphere up to terminal conditions of a pot temperature of 120° at 10 mm. Hg. The residue obtained was composed of two immisicible liquids which were separated via a separatory funnel. The liquid with the lower density weighed 42 grams and was mineral oil. The liquid with the greater density weighed 245 grams from which 51.7 grams (16.2% theory) of isoidide bisglycidyl ether was obtained by fractional distillation under vacuum in an inert atmosphere. The product, distilling at 153–156° C. under 0.30 millimeter pressure, had a refractive index of 1.4838 and an epoxide equivalent of 134.

The bisglycidyl ethers of isohexides are diepoxides and are useful as intermediates in the formation of synthetic resins. In addition they have utility as shrink-proofing and wrinkle-resisting agents for textiles. By way of illustration, cotton fabric impregnated, by padding from aqueous solution, with 5% by weight of isosorbide bisglycidyl ether catalyzed with zinc fluoborate, dried and cured for 5 minutes at 350° F., showed only half as much shrinkage on repeated laundering as did the untreated cotton. The same treated sample showed a 46% improvement in crease recovery over the control when tested by AATCC Test No. 66–1959.

A further utility of the isohexide bisglycidyl ethers is found in their inhibitory effects against certain cancer cells, and particularly against leukemia.

In a standard screening test employing inbred mice, each animal has $10^5$ leukemia–1210 cells (ascitic form) implanted intraperitoneally in a dilution of $10^7$ cells/ml. The test animals are then given daily injections of the agent under test and their survival times compared with those of the controls. An agent that results in a survival time of more than 124 percent of the controls has passed the test.

The following table shows results obtained when the bisglycidyl ethers of isosorbide and isoidide were subjected to the test.

| Bisglycidyl Ether of— | Daily Dose, mg./kg. | Survival Time Ratio, Percent Test/Control | |
|---|---|---|---|
| | | 1st Test | 2d Test |
| Isosorbide | 200 | 142 | 155 |
| Do | 300 | 151 | 131 |
| Isoidide | 155 | 141 | 137 |
| Do | 233 | 160 | 147 |
| Do | 350 | 175 | |

In the Dunning leukemia tumor screening tests tumor fragments are implanted subcutaneously in albino Fischer F–344 rats. Twenty-four hours later daily intraperitoneal injections of the agent under test are started and continued for 12 days. The animals are observed until death or until the thirtieth day at which time the experiment is terminated. The survival time ratio of test vs. control animals is noted. Test animals surviving the full thirty days are divided into two classes; tumor-bearing animals are evaluated as 30 day survivors; tumor free animals are termed "cures." Results of this test applied to isohexide bisglycidyl ethers are tabulated below.

| Bisglycidyl Ether of— | Daily Dose, mg./kg. | Survival Time Ratio, Percent T/C | Cures (out of 6) |
|---|---|---|---|
| Isosorbide | 100 | 130 | 0 |
| Isoidide | 100 | 143 | 0 |
| Do | 200 | >187 | 5 |
| Isomannide | 100 | 166 | 0 |

What is claimed is:
1. Isosorbide bisglycidyl ether.
2. Isomannide bisglycidyl ether.
3. Isoidide bisglycidyl ether.

References Cited by the Examiner
UNITED STATES PATENTS 2,267,733 12/1941 Hansley _____ 260—632
2,949,474 8/1960 Murdock et al. _____ 260—348
2,967,186 1/1961 Gordon et al. _____ 260—348
3,041,300 6/1962 Morrison _____ 260—347.8

NICHOLAS S. RIZZO, *Primary Examiner.*

IRVING MARCUS, *Examiner.*

HENRY R. JILES, *Assistant Examiner.*